United States Patent
Bucknor et al.

(10) Patent No.: US 6,705,969 B2
(45) Date of Patent: Mar. 16, 2004

(54) FAMILY OF MULTI-SPEED TRANSMISSION MECHANISMS HAVING THREE PLANETARY GEARSETS AND THREE INPUT TORQUE-TRANSMITTING MECHANISMS

(75) Inventors: Norman Kenneth Bucknor, Troy, MI (US); Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/161,901

(22) Filed: Jun. 4, 2002

(65) Prior Publication Data

US 2003/0224898 A1 Dec. 4, 2003

(51) Int. Cl.$^7$ .................................................. F16H 3/44
(52) U.S. Cl. ........................................ 475/290; 475/275
(58) Field of Search .................................. 475/290, 275

(56) References Cited

U.S. PATENT DOCUMENTS

| | | | |
|---|---|---|---|
| 3,956,946 A | * 5/1976 | Murakami et al. | 475/290 |
| 3,971,267 A | * 7/1976 | Murakami et al. | 475/290 |
| 3,971,268 A | * 7/1976 | Murakami et al. | 475/290 |
| 3,987,690 A | * 10/1976 | Murakami et al. | 475/290 |
| 3,999,448 A | * 12/1976 | Murakami et al. | 475/290 |
| 4,070,927 A | 1/1978 | Polak | 74/765 |
| 5,106,352 A | 4/1992 | Lepelletier | 475/753 |
| 5,133,697 A | * 7/1992 | Hattori | 475/276 |
| 5,226,862 A | * 7/1993 | Hattori | 475/286 |
| 5,599,251 A | 2/1997 | Beim et al. | 475/275 |
| 6,071,208 A | 6/2000 | Koivunen | 475/275 |
| 6,083,135 A | 7/2000 | Baldwin et al. | 475/276 |

FOREIGN PATENT DOCUMENTS

EP 1033510 6/2000

* cited by examiner

Primary Examiner—Dirk Wright
(74) Attorney, Agent, or Firm—Kathryn A. Marra

(57) ABSTRACT

A family of transmissions incorporating three planetary gearsets and five torque-transmitting mechanisms is effective in a powertrain to produce at least six forward speed ratios and one reverse speed ratio between a transmission input shaft and a transmission output shaft. The planetary gearsets each have three planetary gear members in which two of the planetary gearsets have two members continuously interconnected and one of those planetary gearsets and the remaining planetary gearset have two members continuously interconnected. The remaining planetary gearset has one member continuously connected with the transmission housing and the transmission output shaft is continuously connected with at least one member of the planetary gearsets. The planetary gearsets have members that are selectively interconnected with the transmission input shaft through three selectively engageable torque-transmitting mechanisms. One other selectively engageable torque-transmitting mechanism provides a brake or a clutch element for the members of the planetary gearsets. A fifth of the selectively engageable torque transmitting mechanisms provides a brake for the planetary gearsets. The torque-transmitting mechanisms are engaged in combinations of two to establish at least six forward speed ratios and one reverse speed ratio between the transmission input shaft and the transmission output shaft.

9 Claims, 7 Drawing Sheets

| | RATIOS | 156 | 158 | 150 | 152 | 154 |
|---|---|---|---|---|---|---|
| REVERSE | -3.81 | X | | | | X |
| NEUTRAL | 0 | X | | | | |
| 1 | 3.90 | X | | X | | |
| 2 | 2.20 | | X | X | | |
| 3 | 1.52 | | | X | | X |
| 4 | 1.00 | | | X | X | |
| 5 | 0.70 | | | | X | X |
| 6 | 0.59 | | X | | X | |

(X=engaged)

Ring Gear/Sun Gear Tooth Ratios: $\frac{R1}{S1}=2.90, \frac{R2}{S2}=2.73, \frac{R3}{S3}=1.67$

| Ratio Spread | 6.64 |
|---|---|
| Ratio Steps | |
| REV/1 | -0.98 |
| 1/2 | 1.78 |
| 2/3 | 1.45 |
| 3/4 | 1.52 |
| 4/5 | 1.44 |
| 5/6 | 1.18 |

| | RATIOS | 256 | 258 | 250 | 252 | 254 |
|---|---|---|---|---|---|---|
| REVERSE | -2.24 | | X | | X | |
| NEUTRAL | 0 | | X | | | |
| 1 | 2.73 | | X | X | | |
| 2 | 1.54 | X | | X | | |
| 3 | 1.00 | | | X | X | |
| 4 | 0.75 | | | X | | X |
| 5 | 0.57 | | | | X | X |
| 6 | 0.46 | X | | | | X |

(X=engaged)

Ring Gear/Sun Gear Tooth Ratios: $\frac{R1}{S1}=1.87, \frac{R2}{S2}=1.73, \frac{R3}{S3}=1.93$

| Ratio Spread | 6.00 |
|---|---|
| Ratio Steps | |
| REV/1 | -0.82 |
| 1/2 | 1.78 |
| 2/3 | 1.54 |
| 3/4 | 1.33 |
| 4/5 | 1.32 |
| 5/6 | 1.26 |

| | RATIOS | 356 | 358 | 350 | 352 | 354 |
|---|---|---|---|---|---|---|
| REVERSE | -2.04 | | X | | X | |
| NEUTRAL | 0 | | X | | | |
| 1 | 2.93 | | X | X | | |
| 2 | 1.64 | X | | X | | |
| 3 | 1.00 | | | X | X | |
| 4 | 0.76 | | | X | | X |
| 5 | 0.59 | | | | X | X |
| 6 | 0.46 | X | | | | X |

(X=engaged)

Ring Gear/Sun Gear Tooth Ratios: $\frac{R1}{S1}=1.58, \frac{R2}{S2}=1.93, \frac{R3}{S3}=2.13$

| Ratio Spread | 6.42 |
|---|---|
| Ratio Steps | |
| REV/1 | -0.70 |
| 1/2 | 1.79 |
| 2/3 | 1.64 |
| 3/4 | 1.31 |
| 4/5 | 1.30 |
| 5/6 | 1.29 |

| | RATIOS | 458 | 450 | 452 | 454 | 456 |
|---|---|---|---|---|---|---|
| REVERSE | -3.81 | X | | | X | |
| NEUTRAL | 0 | X | | | | |
| 1 | 3.90 | X | X | | | |
| 2 | 2.20 | | X | | | X |
| 3 | 1.52 | | X | | X | |
| 4 | 1.00 | | X | X | | |
| 5 | 0.70 | | | X | X | |
| 6 | 0.59 | | | X | | X |

(X=engaged)

Ring Gear/Sun Gear Tooth Ratios: $\frac{R1}{S1}=2.90, \frac{R2}{S2}=2.73, \frac{R3}{S3}=1.67$

| Ratio Spread | 6.64 |
|---|---|
| Ratio Steps | |
| REV/1 | -0.98 |
| 1/2 | 1.78 |
| 2/3 | 1.45 |
| 3/4 | 1.52 |
| 4/5 | 1.44 |
| 5/6 | 1.18 |

| | RATIOS | 558 | 550 | 552 | 554 | 556 |
|---|---|---|---|---|---|---|
| REVERSE | -2.52 | | | X | | X |
| NEUTRAL | 0 | | | | | X |
| 1 | 2.53 | | X | | | X |
| 2 | 1.44 | X | X | | | |
| 3 | 1.00 | | X | X | | |
| 4 | 0.76 | | X | | X | |
| 5 | 0.58 | | | X | X | |
| 6 | 0.47 | X | | | X | |

(X=engaged)

Ring Gear/Sun Gear Tooth Ratios: $\frac{R1}{S1}=2.30, \frac{R2}{S2}=1.53, \frac{R3}{S3}=1.93$

| Ratio Spread | 5.37 |
|---|---|
| Ratio Steps | |
| REV/1 | -1.00 |
| 1/2 | 1.77 |
| 2/3 | 1.44 |
| 3/4 | 1.31 |
| 4/5 | 1.31 |
| 5/6 | 1.23 |

| | RATIOS | 656 | 658 | 650 | 652 | 654 |
|---|---|---|---|---|---|---|
| REVERSE | -2.04 | | X | | X | |
| NEUTRAL | 0 | | X | | | |
| 1 | 2.93 | | X | X | | |
| 2 | 1.64 | X | | X | | |
| 3 | 1.00 | | | X | X | |
| 4 | 0.76 | | | X | | X |
| 5 | 0.59 | | | | X | X |
| 6 | 0.46 | X | | | | X |

(X=engaged)

Ring Gear/Sun Gear Tooth Ratios: $\frac{R1}{S1}=2.58, \frac{R2}{S2}=1.93, \frac{R3}{S3}=2.13$

| Ratio Spread | 6.42 |
|---|---|
| Ratio Steps | |
| REV/1 | -0.70 |
| 1/2 | 1.79 |
| 2/3 | 1.64 |
| 3/4 | 1.31 |
| 4/5 | 1.30 |
| 5/6 | 1.29 |

| | RATIOS | 758 | 750 | 752 | 754 | 756 |
|---|---|---|---|---|---|---|
| REVERSE | -2.52 | | | X | | X |
| NEUTRAL | 0 | | | | | X |
| 1 | 2.58 | | X | | | X |
| 2 | 1.44 | X | X | | | |
| 3 | 1.00 | | X | X | | |
| 4 | 0.76 | | X | | X | |
| 5 | 0.58 | | | X | X | |
| 6 | 0.47 | X | | | X | |

( X=engaged )

Ring Gear/Sun Gear Tooth Ratios: $\frac{R1}{S1}=2.30, \frac{R2}{S2}=2.53, \frac{R3}{S3}=1.93$

| Ratio Spread | 5.37 |
|---|---|
| Ratio Steps | |
| REV/1 | -1.00 |
| 1/2 | 1.77 |
| 2/3 | 1.44 |
| 3/4 | 1.31 |
| 4/5 | 1.31 |
| 5/6 | 1.23 |

FAMILY OF MULTI-SPEED TRANSMISSION MECHANISMS HAVING THREE PLANETARY GEARSETS AND THREE INPUT TORQUE-TRANSMITTING MECHANISMS

TECHNICAL FIELD

This invention relates to multi-speed transmissions and, more particularly, to a family of multi-speed transmissions in which three planetary gearsets are controlled by five torque-transmitting mechanisms to establish at least six forward speed ratios and one reverse speed ratio.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide a family of improved multi-speed power transmissions having three planetary gearsets.

In one aspect of the present invention, each planetary gearset has three members with a first member of a first planetary gearset being continuously connected with a first member of the second planetary gearset.

In another aspect of the present invention, a second member of the first planetary gearset is continuously interconnected with a second member of the second planetary gearset.

In yet another aspect of the present invention, a third member of the second planetary gearset is continuously interconnected with a first member of the third planetary gearset.

In yet still another aspect of the present invention, a second member of the third planetary gearset is continuously connected to a stationary transmission component.

In a further aspect of the present invention, an input shaft is selectively connectible with members of the three planetary gearsets through three selectively engageable torque-transmitting mechanisms.

In yet a further aspect of the present invention, at least one member of the planetary gearsets is continuously connected with a transmission output shaft.

In another aspect of the present invention, a fourth of the torque-transmitting mechanisms is selectively employed to provide either a stationary torque-transmitting mechanism between the transmission housing and a member of one of the planetary gearsets or a rotating type torque transmitting mechanism to selectively interconnect at least one member of the planetary gearset with at least one other member of the planetary gearsets.

In still another aspect of the present invention, a fifth of the torque-transmitting mechanisms operates as a stationary mechanism to selectively connect a member of one of the planetary gearsets or one of the interconnecting members with the stationary portion of the transmission.

In yet still another aspect of the present invention, the output shaft of the transmission is continuously connected with a third member of either the first or third of the planetary gearsets and the third member of the other of the first or third planetary gearsets is noncontinuously connected with any other gear member of the planetary gearsets.

In yet still another aspect of the present invention, the torque-transmitting mechanisms are selectively engaged in combinations of two to establish at least six forward speed ratios and one reverse speed ratio between the input shaft and the output shaft of the transmission.

DESCRIPTION OF EXEMPLARY EMBODIMENTS

Figures 3, 4:
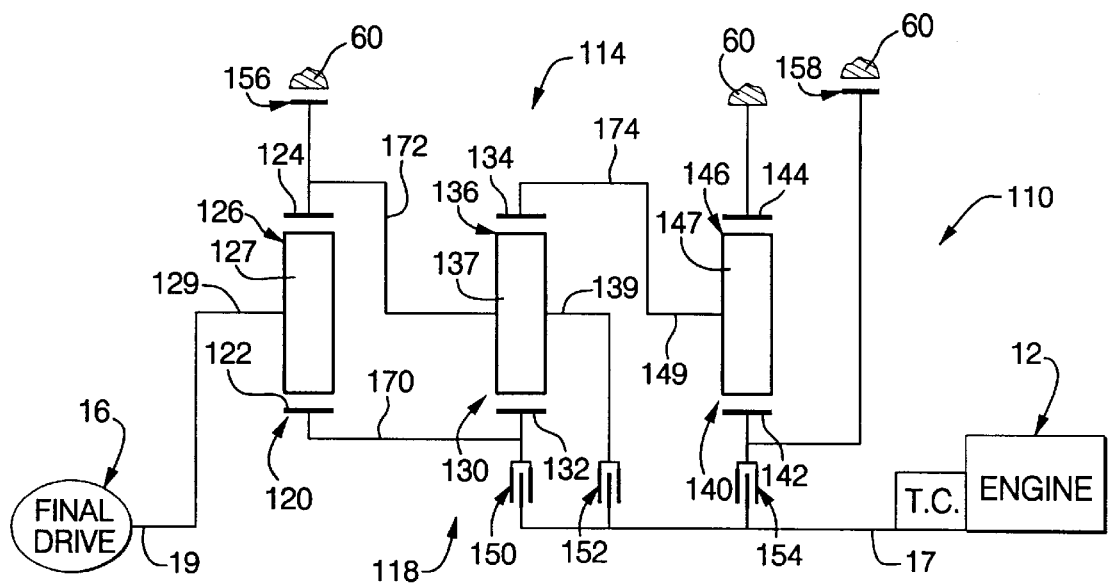
FIG. 3 is a schematic representation of a powertrain incorporating another embodiment of the present invention.
FIG. 4 is a truth table and chart depicting some of the operating characteristics of the embodiment shown in FIG. 3.

Referring to the drawings, wherein like characters represent the same or corresponding parts throughout the several views, a powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. The torque-transmitting mechanisms 150, 152, and 154 are rotating type torque-transmitting mechanisms, and the torque-transmitting mechanisms 156 and 158 are stationary type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a carrier member 129 and meshingly engaging both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a carrier member 139 and meshingly engaging both the sun-gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a carrier member 149 and meshingly engaging both the sun gear member 142 and the ring gear member 144.

The sun gear members 122 and 132 are continuously interconnected by an interconnecting member 170. The ring gear member 124 and planet carrier assembly member 136 are continuously interconnected by an interconnecting member 172. The ring gear member 134 and planet carrier assembly member 146 are continuously interconnected by an interconnecting member 174. The ring gear member 144 is continuously connected with thertransmission housing 60. The planet carrier assembly member 126 is continuously connected with the output shaft 19.

The input shaft 17 is selectively connectible with the interconnecting member 170 through the torque-transmitting mechanism 150, selectively connectible with the interconnecting member 172 through the torque-transmitting mechanism 152, and selectively connectible with the sun gear member 142 through the torque-transmitting mechanism 154. The interconnecting member 172 is selectively connectible with the transmission housing 60 through the torque-transmitting mechanism 156. The sun gear member 142 is selectively connectible with the transmission housing 60 through the torque-transmitting mechanism 158.

It will be noted by those skilled in the art that the difference between the transmission family member shown in FIG. 1 and the transmission shown in FIG. 3 is the selective operation of the torque-transmitting mechanisms 58 and 158, respectively. In the transmission family member of FIG. 1, this torque-transmitting mechanism is selectively interconnected between the transmission housing and one of the interconnecting members, while in FIG. 3 this torque-transmitting mechanism is selectively connectible between the transmission housing and the gear member of the third planetary gearset that is not continuously connected with any other gear member within the planetary gear arrangement 118.

As seen in FIG. 4, the torque-transmitting mechanisms are selectively engaged in combinations of two to establish at least six forward speed ratios and one reverse speed ratio between the input shaft 17 and the output shaft 19 through the planetary gear arrangement 118. The truth table of FIG. 4 also provides a numerical example of the speed ratios that can be obtained in the planetary gear arrangement 118 when the ring gear/sun gear tooth ratios of the planetary gearsets 120, 130, and 140 are given in numerical values illustrated as R1/S1, R2/S2, and R3/S3, respectively. Also in FIG. 4 is a chart of the ratio steps between adjacent forward speed ratios and between the reverse speed ratio and the first forward speed ratio. This truth table also shows that each of the single step forward interchanges are of the single transition variety, and each of the double step forward interchanges are of the single transition variety.

The reverse speed ratio is established with the engagement of the torque-transmitting mechanism 154 and 156. During the reverse speed ratio, the planet carrier assembly member 146 and ring gear member 134 are rotated at a speed determined by the speed of the sun gear member 142 and the ring gear/sun gear tooth ratio of the planetary gearset 140. The sun gear members 132 and 122 are driven at a speed determined by the speed of the ring gear member 134 and the ring gear/sun gear tooth ratio of the planetary gearset 130. The planet carrier assembly member 136 and therefore output shaft 19 are rotated at a speed determined by the speed of the sun gear member 122 and the ring gear/sun gear tooth ratio of the planetary gearset 120. The numerical value of the reverse speed ratio is determined by the ring gear/sun gear tooth ratios of all three planetary gearsets 120, 130, and 140.

The first forward speed ratio is established with the engagement of the torque-transmitting mechanisms 150 and 156. During the first forward speed ratio, the sun gear member 122 is driven directly by the input shaft 17. The planet carrier assembly member 126 and therefore output shaft 19 are rotated at a speed determined by the speed of the sun gear member 122, and the ring gear/sun gear tooth ratio of the planetary gearset 120. The numerical value of the first forward speed ratio is determined by the ring gear/sun gear tooth ratio of the planetary gearset 120.

The second forward speed ratio is established with the engagement of the torque-transmitting mechanisms 150 and 158. During the second forward speed ratio, the planet carrier assembly member 136 and ring gear member 124 are rotated at a speed determined by the speed of the sun gear member 132 and the ring gear/sun gear tooth ratio of the planetary gearset 130. The planet carrier assembly member 126 and therefore output shaft 19 are rotated at a speed determined by the speed of the sun gear member 122, the speed of the ring gear member 124, and the ring gear/sun gear tooth ratio of the planetary gearset 120. The numerical value of the second forward speed ratio is determined by the ring gear/sun gear tooth ratios of the planetary gearsets 120 and 130.

The third forward speed ratio is established with the engagement of the torque-transmitting mechanisms 150 and 154. During the third forward speed ratio, all three sun gear members 122, 132, and 142 are driven directly by the input shaft 17. The planet carrier assembly member 146 and ring gear member 134 are rotated at a speed determined by the speed of the sun gear member 142 and the ring gear/sun gear tooth ratio of the planetary gearset 140. The planet carrier assembly member 136 and the ring gear member 124 are rotated at a speed determined by the speed of the sun gear member 132, the speed of the ring gear member 134, and the ring gear/sun gear tooth ratio of the planetary gearset 130. The planet carrier assembly member 126 and therefore output shaft 19 are rotated at a speed determined by the speed of the sun gear member 122, the speed of ring gear member 124, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150 and 152. This combination of engagements provides a lock-up or unitary rotating condition in the planetary gearset 120, such that the input shaft 17 and the output shaft 19 rotate in unison, and therefore the fourth forward speed ratio is a direct drive having a numerical value of one.

The fifth forward speed ratio is established with the engagement of the torque-transmitting mechanisms 152 and 154. During the fifth forward speed ratio, the sun gear member 142, planet carrier assembly member 136, and ring gear member 124 are all driven directly by the input shaft 17. The planet carrier assembly member 146 and ring gear member 134 are rotated at a speed determined by the speed of the sun gear member 142 and the ring gear/sun gear tooth ratio of the planetary gearset 140. The sun gear members 132 and 122 are rotated at a speed determined by the speed of the planet carrier assembly member 136, the speed of the ring gear member 134, and the ring gear/sun gear tooth ratio of the planetary gearset 130. The planet carrier assembly member 126 and therefore output shaft 19 are rotated at a speed determined by the speed of the sun gear member 122, the speed of the ring gear member 124, and the ring gear/sun gear tooth ratio of the planetary gearset 120. The numerical value of the fifth forward speed ratio is determined by the ring gear/sun gear tooth ratios of all three planetary gearsets 120, 130, and 140.

The sixth forward speed ratio is established with the engagement of the torque-transmitting mechanisms 152 and 158. During the sixth forward speed ratio, the planet carrier assembly member 136 and ring gear member 124 are rotated in unison with the input shaft 17. The ring gear member 134 is held stationary. The sun gear members 122 and 132 are rotated at a speed determined by the speed of the planet carrier assembly member 136 and the ring gear/sun gear tooth ratio of the planetary gearset 130. The planet carrier assembly member 126 and therefore output shaft 19 are rotated at a speed determined by the speed of the sun gear member 122, the speed of the ring gear member 124, and the ring gear/sun gear tooth ratio of the planetary gearset 120. The numerical value of the sixth forward speed ratio is determined by the ring gear/sun gear tooth ratios of the planetary gearsets 120 and 130.

Figures 5, 6:
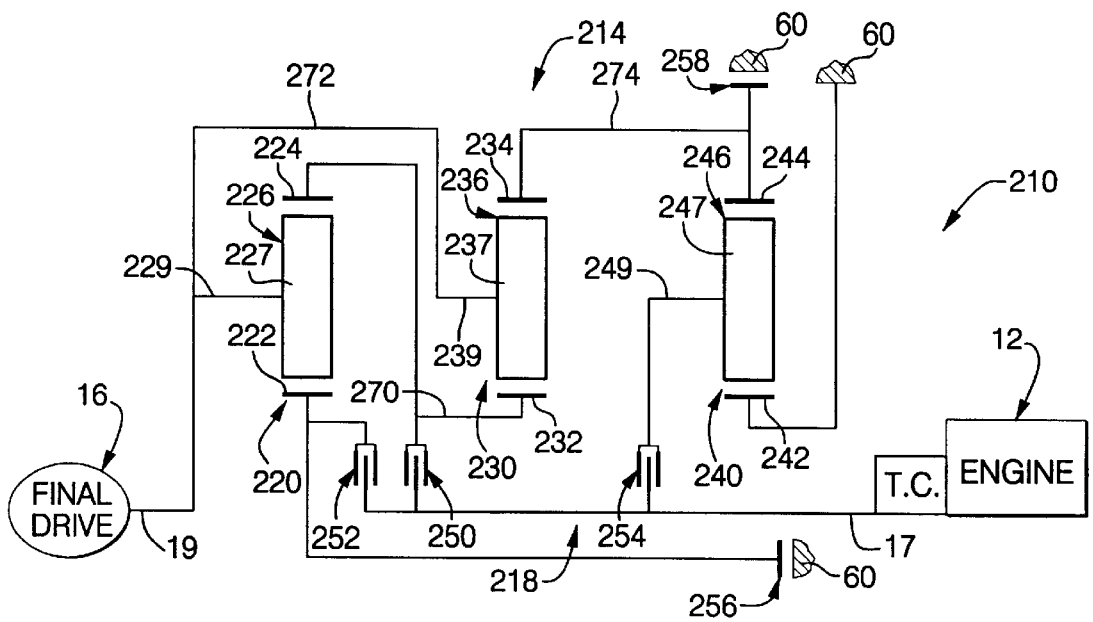
FIG. 5 is a schematic representation of a powertrain incorporating another embodiment of the present invention.
FIG. 6 is a truth table and chart depicting some of the operating characteristics of the embodiment shown in FIG. 5.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five torque-transmitting mechanisms 250, 252, 254, 256, and 258. The torque-transmitting mechanisms 250, 252, and 254 are rotating type torque-transmitting mechanisms, and the torque-transmitting mechanisms 256 and 258 are stationary type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a carrier member 229 and meshingly engaging both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a carrier member 239 and meshingly engaging both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a carrier member 249 and meshingly engaging both the sun gear member 242 and the ring gear member 244.

The ring gear member 224 and sun gear member 232 are continuously interconnected by an interconnecting member 270. The planet carrier assembly member 236, planet carrier assembly member 226, and output shaft 19 are continuously interconnected by an interconnecting member 272. The ring gear member 234 and ring gear member 244 are continuously interconnected by an interconnecting member 274. The sun gear member 242 is continuously connected with the transmission housing 60.

The input shaft 17 is selectively connectible with the interconnecting member 270 through the torque-transmitting mechanism 250, selectively connectible with the sun gear member 222 through the torque-transmitting mechanism 252, and selectively connectible with the planet carrier assembly member 246 through the torque-transmitting mechanism 254. The sun gear member 222 is selectively connectible with the transmission housing 60 through the torque-transmitting mechanism 256. The interconnecting member 274 is selectively connectible with the transmission housing 60 through the torque-transmitting mechanism 258.

The sun gear member 222 and planet carrier assembly member 246 are not continuously interconnected with members of the other planetary gearsets except through the selectively engageable mechanisms. This differs from the family members in FIGS. 1 and 2 in that there are two noncontinuously interconnected members and the stationary torque-transmitting mechanism 256 controls the sun gear of the planetary gearset 220.

The truth table and chart of FIG. 6 provides a pictorial representation of the engagement of the torque-transmitting mechanisms which are engaged in combinations of two to establish the reverse speed ratio and six forward speed ratios between the input shaft 17 and the output shaft 19 through the planetary gear arrangement 218. Also provided in the truth table is an example of speed ratios that are attainable with the planetary gear arrangement 218 when the ring gear/sun gear tooth ratios of the planetary gearsets 220, 230, and 240 are chosen as illustrated in FIG. 6 as R1/S1, R2/S2, and R3/S3, respectively. The chart of FIG. 6 shows the ratio steps between adjacent forward speed ratios as well as between the reverse speed ratio and first forward speed ratio. It will also be evident from the truth table that each of the forward ratio single step interchanges as well as double step interchanges are of the single transition variety.

To establish the reverse speed ratio, the torque-transmitting mechanisms 252 and 258 are selectively engaged. During the reverse speed ratio, the ring gear member 224 and sun gear member 232 are driven at a speed determined by the speed of the sun gear member 222, the speed of the planet carrier assembly member 226, and the ring gear/sun gear tooth ratio of the planetary gearset 220. The planet carrier assembly member 236, planet carrier assembly member 226, and output shaft 19 are driven at a speed determined by the speed of the sun gear member 232 and the ring gear/sun gear tooth ratio of the planetary gearset 230. The numerical value of the reverse speed ratio is determined by the ring gear/sun gear tooth ratios of the planetary gearsets 220 and 230.

The first forward speed ratio is established with the engagement of the torque-transmitting mechanisms 250 and 258. During the first forward speed ratio, the planet carrier assembly member 236, planet carrier assembly member 226 and therefore output shaft 19 are rotated at a speed determined by the speed of the sun gear member 232 and the ring gear/sun gear tooth ratio of the planetary gearset 230. The numerical value of the first forward speed ratio is determined by the ring gear/sun gear tooth ratio of the planetary gearset 230.

The second forward speed ratio is established with the engagement of the torque-transmitting mechanisms 250 and 256. During the second forward speed ratio, the ring gear member 224 rotates in unison with the input shaft 17. The planet carrier assembly member 226 and therefore output shaft 19 are rotated at a speed determined by the speed of the ring gear member 224 and the ring gear/sun gear tooth ratio of the planetary gearset 220. The numerical value of the second forward speed ratio is determined by the ring gear/sun gear tooth ratio of the planetary gearset 220.

The third forward speed ratio is established with the engagement of the torque-transmitting mechanisms 250 and 252. This combination of engagements causes the direct drive in the planetary gearset 220 and therefore between the input shaft 17 and the output shaft 19. The third forward speed ratio is indeed a direct drive having a numerical value of one.

The fourth forward speed ratio is established with the engagement of the torque-transmitting mechanisms 250 and 254. During the fourth forward speed ratio, the ring gear member 244 and ring gear member 234 are rotated at a speed determined by the speed of the planet carrier assembly member 246 and the ring gear/sun gear tooth ratio of the planetary gearset 240. The planet carrier assembly member 236 and therefore output shaft 19 are rotated at a speed determined by the speed of the sun gear member 232, the speed of the ring gear member 234, and the ring gear/sun gear tooth ratio of the planetary gearset 230. The numerical value of the fourth forward speed ratio is determined by the ring gear/sun gear tooth ratios of the planetary gearsets 230 and 240.

The fifth forward speed ratio is established with the engagement of the torque-transmitting mechanisms 252 and 254. During the fifth forward speed ratio, the ring gear members 244 and 234 are rotated at a speed determined by the speed of the planet carrier assembly member 246 and the ring gear/sun gear tooth ratio of the planetary gearset 240. The ring gear member 224 and sun gear member 232 are rotated at a speed determined by the speed of the sun gear member 222, the speed of the planet carrier assembly member 226, and the ring gear/sun gear tooth ratio of the planetary gearset 220. The planet carrier assembly member 236, planet carrier assembly member 226 and therefore output shaft 19 are rotated at a speed determined by the speed of the sun gear member 232, the speed of the ring gear member 234, and the ring gear/sun gear tooth ratio of the planetary gearset 230. The numerical value of the fifth forward speed ratio is determined by ring gear/sun gear tooth ratios of all three planetary gearsets 220, 230, and 240.

The sixth forward speed ratio is established with the engagement of the torque-transmitting mechanisms 254 and 256. During the sixth forward speed ratio, the ring gear members 244 and 234 are rotated at a speed determined by the speed of the planet carrier assembly member 246 and the ring gear/sun gear tooth ratio of the planetary gearset 240. The sun gear member 232 and ring gear member 224 are rotated at a speed determined by the speed of the ring gear member 234, the speed of the planet carrier assembly member 236, and the ring gear/sun gear tooth ratio of the planetary gearset 230. The planet carrier assembly member 226 and output shaft 19 are rotated at a speed determined by the speed of the ring gear member 224 and the ring gear/sun gear tooth ratio of the planetary gearset 220. The numerical value of the sixth forward speed ratio is determined by the ring gear/sun gear tooth ratios of all three planetary gearsets 220, 230, and 240.

Figures 7, 8:
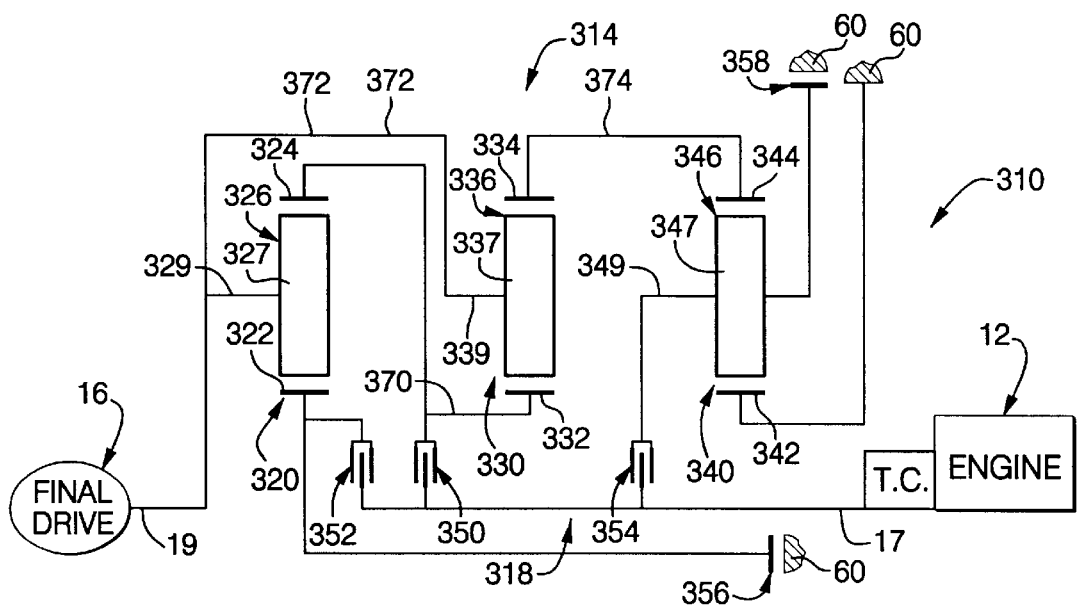
FIG. 7 is a schematic representation of a powertrain incorporating another embodiment of the present invention.
FIG. 8 is a truth table and chart depicting some of the operating characteristics of the embodiment shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five torque-transmitting mechanisms 350, 352, 354, 356, and 358. The torque-transmitting mechanisms 350, 352, and 354 are rotating type torque-transmitting mechanisms, and the torque-transmitting mechanisms 356 and 358 are stationary type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a carrier member 329 and meshingly engaging both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a carrier member 339 and meshingly engaging both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a carrier member 349 and meshingly engaging both the sun gear member 342 and the ring gear member 344.

The ring gear member 324 and sun gear member 332 are continuously interconnected by an interconnecting member 370. The planet carrier assembly member 326, planet carrier assembly member 336, and output shaft 19 are continuously interconnected by an interconnecting member 372. The ring gear members 334 and 344 are continuously interconnected by an interconnecting member 374. The sun gear member 342 is continuously connected with the transmission housing 60.

The input shaft 17 is selectively interconnectible with the interconnecting member 370 through the torque-transmitting mechanism 350, selectively interconnectible with the sun gear member 322 through the torque-transmitting mechanism 352, and selectively connectible with the planet carrier assembly member 346 through the torque-transmitting mechanism 354. The sun gear member 322 is selectively connectible with the transmission housing 60 through the torque-transmitting mechanism 356, and the planet carrier assembly member 346 is selectively connectible with the transmission housing 60 through the torque-transmitting mechanism 358. As with the family members shown in FIG. 5, the sun gear member 322 and planet carrier assembly member 346 are not continuously interconnected with members of the other planetary gearsets except through the selectively engageable torque-transmitting mechanisms.

The truth table of FIG. 8 shows that the torque-transmitting mechanisms are engaged in combinations of two to establish a reverse speed ratio and six forward speed ratios between the input shaft 17 and the output shaft 19 through the planetary gear arrangement 318. The truth table also shows that each of the forward single step interchanges as well as the forward double step interchanges are of the single transition variety. Also given in FIG. 8 is an example of speed ratios that are attainable with the planetary gear arrangement 318 when the ring gear/sun gear tooth ratios of the planetary gearsets 320, 330, and 340 are selected as shown as R1/S1, R2/S2, and R3/S3, respectively. Further, the chart of FIG. 8 describes the ratio steps between single step forward ratio interchanges as well the ratio step between the reverse and first forward speed ratio.

The reverse speed ratio is established with the engagement of the torque-transmitting mechanisms 352 and 358. During the reverse speed ratio, the ring gear member 324 and sun gear member 332 are rotated at a speed determined by the speed of the sun gear member 322, the speed of the planet carrier assembly member 326, and the ring gear/sun gear tooth ratio of the planetary gearset 320. The planet carrier assembly members 336 and 326 and therefore output shaft 19 are rotated at a speed determined by the speed of the sun gear member 322 and the ring gear/sun gear tooth ratio of the planetary gearset 330. The numerical value of the reverse speed ratio is determined by the ring gear/sun gear tooth ratios of the planetary gearsets 320 and 330.

The first forward speed ratio is established with the engagement of the torque-transmitting mechanisms 350 and 358. During the first forward speed ratio, the planet carrier assembly member 336 and therefore output shaft 19 are driven forwardly at a speed determined by the speed of the sun gear member 332 and the ring gear/sun gear tooth ratio of the planetary gearset 330. The numerical value of the first forward speed ratio is determined by the ring gear/sun gear tooth ratio of the planetary gearset 330.

The second forward speed ratio is established with the engagement of the torque-transmitting mechanisms 350 and 356. During the second forward speed ratio, the planet carrier assembly member 326 and therefore output shaft 19 are rotated at a speed determined by the speed of the ring gear member 324 and the ring gear/sun gear tooth ratio of the planetary gearset 320. The numerical value of the second forward speed ratio is determined by the ring gear/sun gear tooth ratio of the planetary gearset 320.

The third forward speed ratio is established with the engagement of the torque-transmitting mechanisms 350 and 352 which place the planetary gearset 320 in a direct drive situation such that the input shaft 17 and the output shaft 19 rotate in unison. The numerical value of the third forward speed ratio is one.

The fourth forward speed ratio is established with the engagement of the torque-transmitting mechanisms 350 and 354. During the fourth forward speed ratio, the ring gear members 344 and 334 are rotated at a speed determined by the speed of the planet carrier assembly member 346 and the ring gear/sun gear tooth ratio of the planetary gearset 340. The planet carrier assembly member 336 and therefore output shaft 19 are rotated at a speed determined by the speed of the sun gear member 332, the speed of the ring gear member 334, and the ring gear/sun gear tooth ratio of the planetary gearset 330. The numerical value of the fourth forward speed ratio is determined by the ring gear/sun gear tooth ratios of the planetary gearsets 330 and 340.

The fifth forward speed ratio is established with the engagement of the torque-transmitting mechanisms 352 and 354. During the fifth forward speed ratio, the ring gear members 344 and 334 are rotated at a speed determined by the speed of the planet carrier assembly member 346 and the ring gear/sun gear tooth ratio of the planetary gearset 340. The sun gear member 332 and ring gear member 324 are rotated at a speed determined by the speed of the ring gear member 334, the speed of the planet carrier assembly member 336, and the ring gear/sun gear tooth ratio of the planetary gearset 330. The planet carrier assembly member 326, planet carrier assembly member 336, and output shaft 19 are rotated at a speed determined by the speed of the sun gear member 322, the speed of the ring gear member 324, and the ring gear/sun gear tooth ratio of the planetary gearset 320. The numerical of the fifth forward speed ratio is determined by the ring gear/sun gear tooth ratios of all three planetary gearsets 320, 330, and 340.

The sixth forward speed ratio is established with the engagement of the torque-transmitting mechanisms 354 and 356. During the sixth forward speed ratio, the ring gear members 334 and 344 are rotated at a speed determined by the speed of the planet carrier assembly member 346 and the ring gear/sun gear tooth ratio of the planetary gearset 340. The sun gear member 332 and ring gear member 324 are rotated at a speed determined by the speed of the ring gear member 334, the speed of the planet carrier assembly member 336, and the ring gear/sun gear tooth ratio of the planetary gearset 330. The planet carrier assembly member 326, planet carrier assembly member 336, and therefore output shaft 19 are rotated at a speed determined by the speed of the ring gear member 324 and the ring gear/sun gear tooth ratio of the planetary gearset 320. The numerical value of the sixth forward speed ratio is determined by the ring gear/sun gear tooth ratios of all three planetary gearsets 320, 330, and 340.

Figures 9, 10:
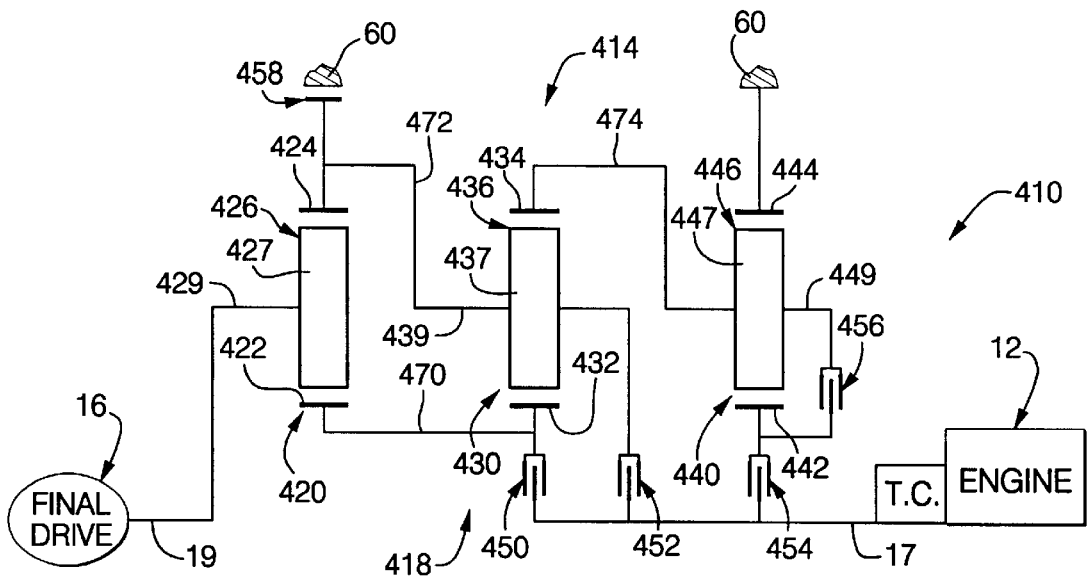
FIG. 9 is a schematic representation of a powertrain incorporating another embodiment of the present invention.
FIG. 10 is a truth table and chart depicting some of the operating characteristics of the embodiment shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five torque-transmitting mechanisms 450, 452, 454, 456, and 458. The torque-transmitting mechanisms 450, 452, 454, and 456 are rotating type torque-transmitting mechanisms, and the torque-transmitting mechanism 458 is a stationary type torque-transmitting mechanism.

The planetary gearset 420 includes a sun gear member 422, a ring gear member 424, and a planet carrier assembly member 426. The planet carrier assembly member 426 includes a plurality of pinion gears 427 rotatably mounted on a carrier member 429 and meshingly engaging both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a carrier member 439 and meshingly engaging both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a carrier member 449 and meshingly engaging both the sun gear member 442 and the ring gear member 444.

The sun gear member 422 is continuously interconnected with sun gear member 432 through an interconnecting member 470. The ring gear member 424 and planet carrier assembly member 436 are continuously interconnected through an interconnecting member 472. The ring gear member 434 and planet carrier assembly member 446 are continuously interconnected through an interconnecting member 474. The output shaft 19 is continuously connected with planet carrier assembly member 426. The ring gear member 444 is continuously connected with the transmission housing 60.

The input shaft 17 is selectively connectible with the interconnecting member 470 through the torque-transmitting mechanism 450, selectively connectible with the interconnecting member 472 through the torque-transmitting mechanism 452, and selectively connectible with the sun gear member 442 through the torque-transmitting mechanism 454. The sun gear member 442 is selectively connectible with the interconnecting member 474 through the torque-transmitting mechanism 456. The interconnecting member 472 is selectively connectible with transmission housing 60 through the torque-transmitting mechanism 458. It should be noted that the sun gear member 442 is not continuously interconnected with a member of either of the other two planetary gearsets except by way of the selectively engageable torque-transmitting mechanisms. It should also be noted that the torque-transmitting mechanism 456 is a rotating type torque-transmitting mechanism which when engaged will cause the planetary gearset 440 and ring gear member 434 to be held stationary by the transmission housing 60.

The torque-transmitting mechanisms are engaged in combinations of two as shown in truth table of FIG. 10 to establish a reverse speed ratio and six forward speed ratios between the input shaft 17 and the output shaft 19 through the planetary gear arrangement 418. Also given in the truth table is an example of the numerical values that are attainable with the planetary gear arrangement 418 when the ring gear/sun gear tooth ratios of the planetary gearsets 420, 430, and 440 are selected as shown in FIG. 10 as R1/S1, R2/S2, and R3/S3, respectively. Also noted in the truth table is the fact that each of the single step forward ratio interchanges is of the single transition variety, and each of the double step forward ratio interchanges is of the single transition variety. The chart of FIG. 10 provides the numerical values of the ratio steps between the adjacent forward speed ratios and also between the reverse and first forward speed ratio when the given ring gear/sun gear tooth ratios are employed.

The reverse speed ratio is established with the engagement of the torque-transmitting mechanisms 454 and 458. During the reverse speed ratio, the planet carrier assembly member 446 and ring gear member 434 are rotated at a speed determined by the speed of the sun gear member 442 and the ring gear/sun gear tooth ratio of the planetary gearset 440. The sun gear members 432 and 422 are rotated at a speed determined by the speed of the ring gear member 434 and the ring gear/sun gear tooth ratio of the planetary gearset 430. The planet carrier assembly member 426 and therefore output shaft 19 are rotated at a speed determined by the speed of the sun gear member 422 and the ring gear/sun gear tooth ratio of the planetary gearset 420. The numerical value of the reverse speed ratio is determined by the ring gear/sun gear tooth ratios of all three planetary gearsets 420, 430, and 440.

The first forward speed ratio is established with the engagement of the torque-transmitting mechanisms 450 and 458. During the first forward speed ratio, the planet carrier assembly member 426 and therefore output shaft 19 are driven at a speed determined by the speed of the sun gear member 422 and the ring gear/sun gear tooth ratio of the planetary gearset 420. The numerical value of the first forward speed ratio is determined by the ring gear/sun gear tooth ratio of the planetary gearset 420.

The second forward speed ratio is established with the engagement of the torque-transmitting mechanisms 450 and 456. During the second forward speed ratio, the speed of the planet carrier assembly member 436 and the speed of the ring gear member 424 are determined by speed of the sun gear member 432 and the ring gear/sun gear tooth ratio of the planetary gearset 430. The speed of the planet carrier assembly member 426 and therefore output shaft 19 are determined by the speed of the sun gear member 422, the speed of the ring gear member 424, and the ring gear/sun gear tooth ratio of the planetary gearset 420. The numerical value of the second forward speed ratio is determined by the ring gear/sun gear tooth ratios of the planetary gearsets 420 and 430.

The third forward speed ratio is established with the engagement of the torque-transmitting mechanisms 450 and 454. During the third forward speed ratio, the planet carrier assembly member 446 and ring gear member 434 are rotated at a speed determined by the speed of the sun gear member 442 and the ring gear/sun gear tooth ratio of the planetary gearset 440. The planet carrier assembly member 436 and ring gear member 424 are rotated at a speed determined by the speed of the sun gear member 432, the speed of the ring gear member 434, and the ring gear/sun gear tooth ratio of the planetary gearset 430. The planet carrier assembly member 426 and therefore output shaft 19 are rotated at a speed determined by the speed of the sun gear member 422, the speed of the ring gear member 424, and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450 and 452. With this combination of engagements, the planetary gearset 420 is placed in a 1:1 condition with the input shaft 17 and the output shaft 19. The fourth forward speed ratio is a direct drive having a numerical value of one.

The fifth forward speed ratio is established with the engagement of the torque-transmitting mechanisms 452 and 454. During the fifth forward speed ratio, the planet carrier assembly member 446 and ring gear member 434 are rotated at a speed determined by the speed of the sun gear member 442 and the ring gear/sun gear tooth ratio of the planetary gearset 440. The sun gear members 432 and 422 are rotated at a speed determined by the speed of the ring gear member 434, the speed of the planet carrier assembly member 436, and the ring gear/sun gear tooth ratio of the planetary gearset 430. The planet carrier assembly member 426 and therefore output shaft 19 are rotated at a speed determined by the speed of the sun gear member 422, the speed of the ring gear member 424, and the ring gear/sun gear tooth ratio of the planetary gearset 420. The numerical value of the fifth forward speed ratio is determined by the ring gear/sun gear tooth ratios of all three planetary gearsets 420, 430, and 440.

The sixth forward speed ratio is established with the engagement of the torque-transmitting mechanisms 452 and 456. During the sixth forward speed ratio, the ring gear member 434 is stationary. The sun gear members 432 and 422 are rotated at a speed determined by the speed of the planet carrier assembly member 436 and the ring gear/sun gear tooth ratio of the planetary gearset 430. The planet carrier assembly member 426 and therefore output shaft 19 are rotated at a speed determined by the speed of the ring gear member 424, the speed of the sun gear member 422, and the ring gear/sun gear tooth ratio of the planetary gearset 420. The numerical value of the sixth forward speed ratio is determined by the ring gear/sun gear tooth ratios of the planetary gearsets 420 and 430.

Figures 11, 12:
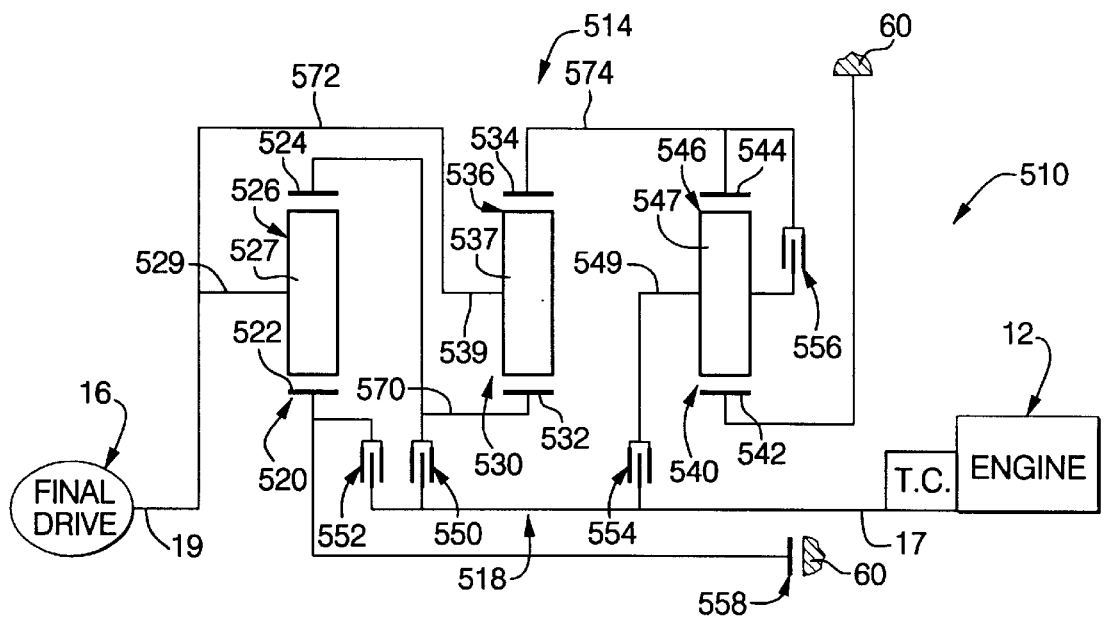
FIG. 11 is a schematic representation of a powertrain incorporating another embodiment of the present invention.
FIG. 12 is a truth table and chart depicting some of the operating characteristics of the embodiment shown in FIG. 11.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five torque-transmitting mechanisms 550, 552, 554, 556, and 558. The torque-transmitting mechanisms 550, 552, 554, and 556 are rotating type torque-transmitting mechanisms, and the torque-transmitting mechanism 558 is a stationary type torque-transmitting mechanism.

As with the family members shown in FIG. 9, the torque-transmitting mechanism 556, which is a rotating type torque-transmitting mechanism, will when engaged cause the entire planetary gearset 540 as well as the ring gear member 534 to remain stationary. While this is a normally rotating type torque-transmitting mechanism, it is effectively a brake when applied.

The planetary gearset 520 includes a sun gear member 522, a ring gear member 524, and a planet carrier assembly member 526. The planet carrier assembly member 526 includes a plurality of pinion gears 527 rotatably mounted on a carrier member 529 and meshingly engaging both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a carrier member 539 and meshingly engaging both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a carrier member 549 and meshingly engaging both the sun gear member 542 and the ring gear member 544.

The truth table shown in FIG. 12 describes the combinations of engagements of the torque-transmitting mechanisms to provide a reverse speed ratio and six forward speed ratios. As is noted, the torque-transmitting mechanisms are engaged in combinations of two. Also as noted in the truth table, the single step interchanges in the forward direction as well as the double step interchanges in the forward direction are each of the single transition variety. Also provided in FIG. 12 is a numerical example of the ring gear/sun gear tooth ratios that are available in the planetary gear arrangement 518 when the ring gear/sun gear tooth ratios of the planetary gearsets 520, 530, 540 are selected as shown in FIG. 12 as R1/S1, R2/S2, and R3/S3, respectively. A chart as shown in FIG. 12 provides a numerical example of the ratio steps between the adjacent forward speed ratios as well as between the reverse and first forward speed ratio.

The reverse speed ratio is established with the engagement of the torque-transmitting mechanisms 552 and 556. During the reverse speed ratio, the ring gear member 524 and sun gear member 532 are rotated at a speed determined by the speed of the sun gear member 522, the speed of the planet carrier assembly member 526, and the ring gear/sun gear tooth ratio of the planetary gearset 520. The planet carrier assembly member 536 and planet carrier assembly member 526, as well the output shaft 19, are rotated at a speed determined by the speed of the sun gear member 532 and the ring gear/sun gear tooth ratio of the planetary gearset 530. The numerical value of the reverse speed ratio is determined by the ring gear/sun gear tooth ratios of the planetary gearsets 520 and 530.

The first forward speed ratio is established with the engagement of the torque-transmitting mechanisms 550 and 556. During the first forward speed ratio, the planet carrier assembly member 536, planet carrier assembly member 526 and therefore output shaft 19 are rotated at a speed determined by the speed of the sun gear member 532 and the ring gear/sun gear tooth ratio of the planetary gearset 530. The numerical value of the first forward speed ratio is determined by the ring gear/sun gear tooth ratio of the planetary gearset 530.

The second forward speed ratio is established with the engagement of the torque-transmitting mechanisms 550 and 558. During the second forward speed ratio, the ring gear member 524 is driven directly by the input shaft 17. The planet carrier assembly member 526 and therefore output shaft 19 are rotated at a speed determined by the speed of the ring gear member 524 and the ring gear/sun gear tooth ratio of the planetary gearset 520. The numerical value of the second forward speed ratio is determined by the ring gear/sun gear tooth ratio of the planetary gearset 520.

The third forward speed ratio is established with the engagement of the torque-transmitting mechanisms 550 and 552. As with each of the previously described family members, the engagement of this combination creates a 1:1 drive condition between the input shaft 17 and the output shaft 19 by rotating the planetary gearset 520 in unison with the input shaft 17. The third forward speed ratio is a direct drive having a numerical value of one.

The fourth forward speed ratio is established with the engagement of the torque-transmitting mechanisms 550 and 554. During the fourth forward speed ratio, the ring gear members 544 and 534 are rotated at a speed determined by the speed of the planet carrier assembly member 546 and the ring gear/sun gear tooth ratio of the planetary gearset 540. The planet carrier assembly member 536 and therefore output shaft 19 are rotated at a speed determined by the speed of the ring gear member 534, the speed of the sun gear member 532, and the ring gear/sun gear tooth ratio of the planetary gearset 530. The numerical value of the fourth forward speed ratio is determined by the ring gear/sun gear tooth ratios of the planetary gearsets 530 and 540.

The fifth forward speed ratio is established with the engagement of the torque-transmitting mechanisms 552 and 554. During the fifth forward speed ratio, the ring gear members 544 and 534 are rotated at a speed determined by the speed of the planet carrier assembly member 546 and the ring gear/sun gear tooth ratio of the planetary gearset 540. The sun gear member 532 and ring gear member 524 are rotated at a speed determined by the speed of the ring gear member 534, the speed of the planet carrier assembly member 536, and the ring gear/sun gear tooth ratio of the planetary gearset 530. The planet carrier assembly member 526 and therefore output shaft 19 are rotated at a speed determined by the speed of the sun gear member 522, the speed of the ring gear member 524, and the ring gear/sun gear tooth ratio of the planetary gearset 520. The numerical value of the fifth forward speed ratio is determined by the ring gear/sun gear tooth ratios of all three planetary gearsets 520, 530, and 540.

The sixth forward speed ratio is established with the engagement of the torque-transmitting mechanisms 554 and 558. During the sixth forward speed ratio, the ring gear members 544 and 534 are rotated at a speed determined by the speed of the planet carrier assembly member 546 and the ring gear/sun gear tooth ratio of the planetary gearset 540. The sun gear member 532 and ring gear member 524 are rotated at a speed determined by the speed of the ring gear member 534, the speed of the planet carrier assembly member 536, and the ring gear/sun gear tooth ratio of the planetary gearset 530. The planet carrier assembly members 536 and 526, as well as output shaft 19, are rotated at a speed determined by the speed of the ring gear member 524 and the ring gear/sun gear tooth ratio of the planetary gearset 520. The numerical value of the sixth forward speed ratio is determined by the ring gear/sun gear tooth ratios of all three planetary gearsets 520, 530, and 540.

Figures 13, 14:
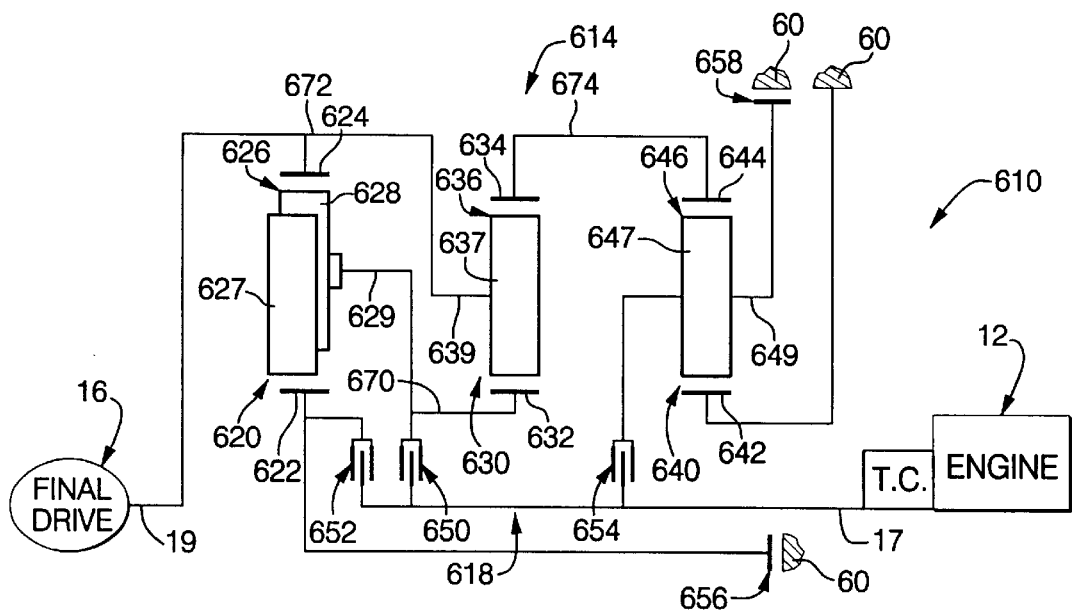
FIG. 13 is a schematic representation of a powertrain incorporating another embodiment of the present invention.
FIG. 14 is a truth table and chart depicting some of the operating characteristics of the embodiment shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and five torque-transmitting mechanisms 650, 652, 654, 656, and 658. The torque-transmitting mechanisms 650, 652, 654 are rotating type torque-transmitting mechanisms, and the torque-transmitting mechanisms 656 and 658 are stationary type torque-transmitting mechanisms.

The planetary gearset 620 includes a sun gear member 622, a ring gear member 624, and a planet carrier assembly member 626. The planet carrier assembly member 626 includes a plurality of pairs of intermeshing pinion gears 627 and 628 that are rotatably mounted on a carrier member 629 and disposed in meshing relationship with the sun gear member 622 and the ring gear member 624, respectively.

The planetary gearset 630 includes a sun gear member 632, a ring gear member 634, and a planet carrier assembly member 636. The planet carrier assembly member 636 includes a plurality of pinion gears 637 rotatably mounted on a carrier member 639 and meshingly engaging both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a carrier member 649 and meshingly engaging both the sun gear member 642 and the ring gear member 644.

The planet carrier assembly member 626 is continuously interconnected with the sun gear member 632 through an interconnecting member 670. The planet carrier assembly member 636, ring gear member 624, and output shaft 19 are continuously interconnected through an interconnecting member 672. The ring gear members 634 and 644 are continuously interconnected through an interconnecting member 674. The sun gear member 642 is continuously connected with the transmission housing 60.

The input shaft 17 is selectively connectible with the interconnecting member 670 through the torque-transmitting mechanism 650, selectively connectible with the sun gear member 622 through the torque-transmitting mechanism 652, and selectively connectible with the planet carrier assembly member 646 through the torque-transmitting mechanism 654. The sun gear member 622 is selectively connectible with the transmission housing 60 through the torque-transmitting mechanism 656, and the planet carrier assembly member 646 is selectively connectible with the transmission housing 60 through the torque-transmitting mechanism 658. It will be noted that the sun gear member 622 and planet carrier assembly member 646 are not otherwise continuously interconnected with members of the other planetary gearsets except by way of the torque-transmitting mechanisms.

The torque-transmitting mechanisms are engaged in combinations of two, as shown in the truth of FIG. 14, to provide six forward speed ratios and one reverse speed ratio through the planetary gear arrangement 618 between the input shaft 17 and the output shaft 19. Also given in FIG. 14 is a numerical example of the speed ratios that are available with the planetary gear arrangement 618 when the ring gear/sun gear tooth ratios of the planetary gearsets 620, 630, and 640 are chosen as shown in FIG. 14 as R1/S1, R2/S2, and R3/S3, respectively. Further information given in FIG. 14 are the ratio steps between adjacent forward speed ratios as well as the ratio step between the reverse speed ratio and the first forward speed ratio. The truth table describes the sequence of engagements which produce the six forward speed ratios. It will be noted that all of the single step forward interchanges as well as the double step forward interchanges are of the single transition variety.

The reverse speed ratio is established with the engagement of the torque-transmitting mechanisms 652 and 658. During the reverse speed ratio, the planet carrier assembly member 626 and sun gear member 632 are rotated at a speed determined by the speed of the sun gear member 622, the speed of the ring gear member 624, and the ring gear/sun gear tooth ratio of the planetary gearset 620. The planet carrier assembly member 636, ring gear member 624, and output shaft 19 are rotated at a speed determined by the speed of the sun gear member 632 and the ring gear/sun gear tooth ratio of the planetary gearset 630. The numerical value of the reverse speed ratio is determined by the ring gear/sun gear tooth ratios of the planetary gearsets 620 and 630.

The first forward speed ratio is established with the engagement of the torque-transmitting mechanisms 650 and 658. During the first forward speed ratio, the planet carrier assembly member 636, ring gear member 624, and output shaft 19 are rotated at a speed determined by the speed of the sun gear member 632 and the ring gear/sun gear tooth ratio of the planetary gearset 630. The numerical value of the first forward speed ratio is determined by the ring gear/sun gear tooth ratio of the planetary gearset 630.

The second forward speed ratio is established with the engagement of the torque-transmitting mechanisms 650 and 656. During the second forward speed ratio, the planet carrier assembly member 626 is driven at a speed determined by the speed of the input shaft 17. The ring gear member 624 and output shaft 19 are rotated at a speed determined by the speed of the planet carrier assembly member 626 and the ring gear/sun gear tooth ratio of the planetary gearset 620. The numerical value of the second forward speed ratio is determined by the ring gear/sun gear tooth ratio of the planetary gearset 620.

The third forward speed ratio is established with the engagement of the torque-transmitting mechanisms 650 and 652. As with other family members described above, this creates a direct drive in the planetary gearset 620 resulting in a 1:1 drive between the input shaft 17 and the output shaft 19. The numerical value of the third forward speed ratio is one.

The fourth forward speed ratio is established with the engagement of the torque-transmitting mechanisms 650 and 654. During the fourth forward speed ratio, the ring gear members 634 and 644 are rotated at a speed determined by the speed of the planet carrier assembly member 646 and the ring gear/sun gear tooth ratio of the planetary gearset 640. The planet carrier assembly member 636 and output shaft 19 are rotated at a speed determined by the speed of the sun gear member 632, the speed of the ring gear member 634, and the ring gear/sun gear tooth ratio of the planetary gearset 630. The numerical value of the fourth forward speed ratio is determined by the ring gear/sun gear tooth ratios of the planetary gearsets 630 and 640.

The fifth forward speed ratio is established with the engagement of the torque-transmitting mechanisms 652 and 654. During the fifth forward speed ratio, the ring gear members 644 and 634 are rotated at a speed determined by the speed of the planet carrier assembly member 646 and the ring gear/sun gear tooth ratio of the planetary gearset 640. The sun gear member 632 and planet carrier assembly member 626 are rotated at a speed determined by the speed of the ring gear member 634, the speed of the planet carrier assembly member 636, and the ring gear/sun gear tooth ratio of the planetary gearset 630. The ring gear member 624, planet carrier assembly member 636, and output shaft 19 are rotated at a speed determined by the speed of the sun gear member 622, the speed of the planet carrier assembly member 626, and the ring gear/sun gear tooth ratio of the planetary earset 620. The numerical value of the fifth forward speed ratio is etermined by the ring gear/sun gear tooth ratios of all three planetary earsets 620, 630, and 640.

The sixth forward speed ratio is established with the engagement of the torque-transmitting mechanisms 654 and 656. During the sixth forward speed ratio, the ring gear members 644 and 634 are rotated at a speed determined by the speed of the planet carrier assembly member 646 and the ring gear/sun gear tooth ratio of the planetary gearset 640. The sun gear member 632 and planet carrier assembly member 626 are rotated at a speed determined by the speed of the ring gear member 634, the speed of the planet carrier assembly member 636, and the ring gear/sun gear tooth ratio of the planetary gearset 630. The ring gear member 624, planet carrier assembly member 636, and output shaft 19 are rotated at a speed determined by the speed of the planet carrier assembly member 626 and the ring gear/sun gear tooth ratio of the planetary gearset 620. The numerical value of the sixth forward speed ratio is determined by the ring gear/sun gear tooth ratios of all three planetary gearsets 620, 630, and 640.

Figures 15, 16:
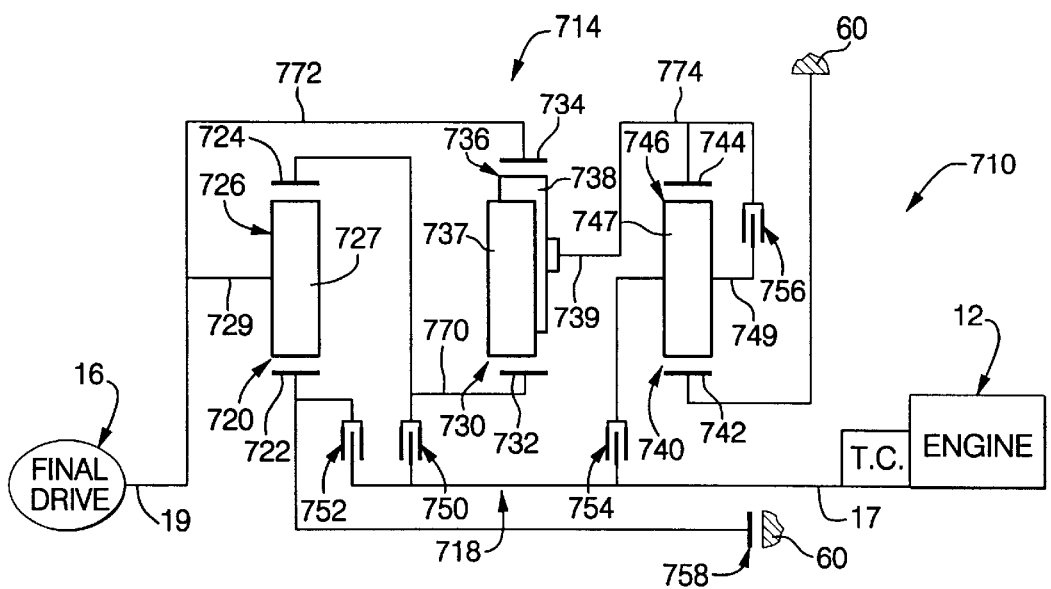
FIG. 15 is a schematic representation of a powertrain incorporating another embodiment of the present invention.
FIG. 16 is a truth table and chart depicting some of the operating characteristics of the embodiment shown in FIG. 15.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five torque-transmitting mechanisms 750, 752, 754, 756, and 758. The torque-transmitting mechanisms 750, 752, 754, and 756 are rotating type torque-transmitting mechanisms, and the torque-transmitting mechanism 758 is a stationary type torque-transmitting mechanism. The torque-transmitting mechanism 756 effectively holds the planetary gearset 740 stationary and will also hold the planet carrier assembly member 736 stationary.

The planetary gearset 720 includes a sun gear member 722, a ring gear member 724, and a planet carrier assembly member 726. The planet carrier assembly member 726 includes a plurality of pinion gears 727 rotatably mounted on a carrier member 729 and meshingly engaging both the sun gear member 722 and the ring gear member 724.

The planetary gearset 730 includes a sun gear member 732, a ring gear member 734, and a planet carrier assembly member 736. The planet carrier assembly member 736 includes a plurality of pairs of intermeshing pinion gears 737 and 738 that are rotatably mounted on a carrier member 739 and disposed in meshing relationship with the sun gear member 732 and the ring gear member 734, respectively.

The planetary gearset 740 includes a sun gear member 742, a ring gear member 744, and a planet carrier assembly member 746. The planet carrier assembly member 746 includes a plurality of pinion gears 747 rotatably mounted on a carrier member 749 and meshingly engaging both the sun gear member 742 and the ring gear member 744.

The ring gear member 724 and sun gear member 732 are continuously interconnected by an interconnecting member 770. The ring gear member 734, the planet carrier assembly member 726, and output shaft 19 are continuously interconnected by an interconnecting member 772. The planet carrier assembly member 736 and ring gear member 744 are continuously interconnected by an interconnecting member 774. The sun gear member 742 is continuously connected with the transmission housing 60.

The input shaft 17 is selectively connectible with the interconnecting member 770 through the torque-transmitting mechanism 750, selectively connectible with the sun gear member 722 through the torque-transmitting mechanism 752, and selectively connectible with the planet carrier assembly member 746 through the torque-transmitting mechanism 754. The planet carrier assembly member 746 is selectively connectible with the interconnecting member 774 through the torque-transmitting mechanism 756. The sun gear member 722 is selectively connectible with the transmission housing 60 through the torque-transmitting mechanism 758. It will now be noted that the ring gear member 722 and planet carrier assembly member 746 are not continuously connected with members of the other planetary gearsets except by way of the selectively engageable torque-transmitting mechanisms.

The truth table of FIG. 16 describes the engagement of the torque-transmitting mechanisms in order to provide a reverse speed ratio and six forward speed ratios through the planetary gear arrangement 718 between the input shaft 17 and the output shaft 19. These torque-transmitting mechanisms are engaged in combinations of two to establish these various speed ratios. Also provided in FIG. 16 is an example of numerical values for the speed ratios which are determined utilizing the ring gear/sun gear tooth ratios of the planetary gearsets 720, 730, and 740, which are given by way of example as R1/S1, R2/S2, and R3/S3, respectively. It will be noted that the single step interchanges in the forward direction as well as the double step interchanges in the forward direction are all of the single transition variety. Further information given in FIG. 16 includes the numerical values for the ratio steps between adjacent forward speed ratios and between the reverse and first forward speed ratio when the given ring gear/sun gear tooth ratios are employed.

The reverse speed ratio is established with the engagement of the torque-transmitting mechanisms 752 and 756. During the reverse speed ratio, the ring gear member 724 and sun gear member 732 are rotated at a speed determined by the speed of the sun gear member 722, the speed of the planet carrier assembly member 726, and the ring gear/sun gear tooth ratio of the planetary gearset 720. The ring gear member 734, planet carrier assembly member 726, and output shaft 19 are rotated at a speed determined by the speed of the sun gear member 732 and the ring gear/sun gear tooth ratio of the planetary gearset 730. The numerical value of the reverse speed ratio is determined by the ring gear/sun gear tooth ratios of the planetary gearsets 720 and 730.

The first forward speed ratio is established with the engagement of the torque-transmitting mechanisms 750 and 756. During the first forward speed ratio, the ring gear member 734, planet carrier assembly member 726, and output shaft 19 are rotated at a speed determined by the speed of the sun gear member 732 and the ring gear/sun gear tooth ratio of the planetary gearset 730. The numerical value of the first forward speed ratio is determined by the ring gear/sun gear tooth ratio of the planetary gearset 730.

The second forward speed ratio is established with the engagement of the torque-transmitting mechanisms 750 and 758. During the second forward speed ratio, the ring gear member 724 is driven directly by the input shaft 17. The planet carrier assembly member 726 and output shaft 19 are rotated at a speed determined by the speed of the ring gear member 724 and the ring gear/sun gear tooth ratio of the planetary gearset 720. The numerical value of the second forward speed ratio is determined by the ring gear/sun gear tooth ratio of the planetary gearset 720.

The third forward speed ratio is established with the engagement of the torque-transmitting mechanisms 750 and 752. During the third forward speed ratio, the planetary gearset 720 is rotated as a unit with the input shaft 17 and the output shaft 19 and therefore provides a direct drive having a numerical value of one.

The fourth forward speed ratio is established with the engagement of the torque-transmitting mechanisms 750 and 754. During the fourth forward speed ratio, the ring gear member 744 and planet carrier assembly member 736 are rotated at a speed determined by the speed of the planet carrier assembly member 746 and the ring gear/sun gear tooth ratio of the planetary gearset 740. The ring gear member 734 and output shaft 19 are rotated at a speed determined by the speed of the sun gear member 732, the speed of the planet carrier assembly member 736, and the ring gear/sun gear tooth ratio of the planetary gearset 730. The numerical value of the fourth forward speed ratio is determined by the ring gear/sun gear tooth ratios of the planetary gearsets 730 and 740.

The fifth forward speed ratio is established with the engagement of the torque-transmitting mechanisms 752 and 754. During the fifth forward speed ratio, the ring gear member 744 and planet carrier assembly member 736 are rotated at a speed determined by the speed of the planet carrier assembly member 746 and the ring gear/sun gear tooth ratio of the planetary gearset 740. The sun gear member 732 and ring gear member 724 are rotated at a speed determined by the speed of the planet carrier assembly member 736, the speed of the ring gear member 734, and the ring gear/sun gear tooth ratio of the planetary gearset 730. The planet carrier assembly member 726, ring gear member 734, and output shaft 19 are driven at a speed determined by the speed of the ring gear member 724, the speed of the sun gear member 722, and the ring gear/sun gear tooth ratio of the planetary gearset 720. The numerical value of the fifth forward speed ratio is determined by the ring gear/sun gear tooth ratios of all three planetary gearsets 720, 730, and 740.

The sixth forward speed ratio is established with the engagement of the torque-transmitting mechanisms 754 and 758. During the sixth forward speed ratio, the ring gear member 744 and planet carrier assembly member 736 are driven at a speed determined by the speed of the planet carrier assembly member 746 and the ring gear/sun gear tooth ratio of the planetary gearset 740. The ring gear member 732 and ring gear member 724 are rotated at a speed determined by the speed of the planet carrier assembly member 736, the speed of the ring gear member 734 and the ring gear/sun gear tooth ratio of the planetary gearset 730. The planet carrier assembly member 726, ring gear member 734, and output shaft 19 are rotated at a speed determined by the speed of the ring gear member 724 and the ring gear/sun gear tooth ratio of the planetary gearset 720. The numerical value of the sixth forward speed ratio is determined by the ring gear/sun gear tooth ratios of all three planetary gearsets 720, 730, and 740.

From the above discussion, it should now be apparent that each of the family members has some characteristics in common. Each family member has three planetary gearsets and each planetary gearset has three planetary members. Two of the planetary gearsets have first and second of those planetary members continuously interconnected, one of those planetary gearsets and the third planetary gearset have two members continuously interconnected. The transmission output shaft is continuously connected with at least one planetary gear member and the transmission input shaft is selectively connectible with the three planetary gearsets through selectively engageable torque-transmitting mechanisms. The one planetary gearset has one member continuously connected with the transmission housing and one member that is noncontinuously connected with any other planetary member except through the torque-transmitting mechanisms employed therein.

Each of the family members have at least one planetary member that is non-continuously interconnected with the other members of the planetary gearset, the transmission housing 60 or the output shaft 19. Some of the family members for example, the family members shown in FIGS. 5, 7, 11, 13 and 15 have two planetary members non-continuously interconnected with other planetary members in the planetary gear arrangement, the transmission housing 60 or the output shaft 19.

Further, each of the family members has at least one stationary torque-transmitting mechanism that is selectively connectible between at least one of the planetary members and the transmission housing, and at least one torque-transmitting mechanism which can operate as either a stationary torque-transmitting mechanism, to effectively interconnect at least one planetary gear member with the planetary housing or a rotating torque-transmitting that will selectively interconnect at least two planetary gear members.

What is claimed is:

1. A multi-speed transmission mechanism comprising:
   an input shaft;
   an output shaft;
   a transmission housing;
   a first planetary gearset having a first member, a second member, and a third member, a second planetary gearset having a first member, a second member, and a third member, and a third planetary gearset having a first member, a second member, and a third member;
   a first interconnecting member continuously interconnecting said first member of said first planetary gearset with said first member of said second planetary gearset;
   a second interconnecting member continuously interconnecting said second member of said first planetary gearset with said second member of said second planetary gearset;
   a third interconnecting member continuously interconnecting said third member of said second planetary gearset with said first member of said third planetary gearset;
   said second member of said third planetary gearset being continuously interconnected with said transmission housing;
   said output shaft being continuously interconnected with at least one member of one of said planetary gearsets;
   a first torque transmitting mechanism selectively interconnecting said input shaft with a member of said first planetary gearset;
   a second torque transmitting mechanism selectively interconnecting said input shaft with a member of said second planetary gearset;
   a third torque transmitting mechanism selectively interconnecting said input shaft with a member of said third planetary gearset;
   a fourth torque transmitting mechanism either selectively interconnecting said transmission housing with a member of one of said planetary gearsets or selectively interconnecting a member of one of said planetary gearsets with another member of one of said planetary gearsets;
   a fifth torque transmitting mechanism selectively interconnecting said transmission housing with said third member of said first or third planetary gearsets;
   said torque transmitting mechanisms being selectively engaged in combinations of two to establish at least six forward speed ratios and one reverse speed ratio between said input shaft and said output shaft.

2. The multi-speed transmission mechanism defined in claim 1 further comprising:
   each of said first members of said first, second, and third planetary gearsets being a member of a group consisting of a sun gear member, a ring gear member, and a planet carrier assembly member;
   each of said second members of said first, second, and third planetary gearsets being a member of the group consisting of a sun gear member, a ring gear member, and a planet carrier assembly member that is not said first member; and
   each of said third members of said first, second, and third planetary gearsets being the member of the group that is not the first or second member.

3. The multi-speed transmission mechanism defined in claim 1 further comprising:
   each of said first members of said first planetary gearset is a member of a first group consisting of a sun gear member, a ring member, and a planet carrier assembly member;
   each of said first members of said second planetary gearset is a member of a second group consisting of a ring gear member, a sun gear member, and a planet carrier assembly member; and
   each of said first members of said third planetary gearset is a member of a third group consisting of a planet carrier assembly member, a ring gear member, and a sun gear member.

4. The multi-speed transnission mechanism defined in claim 3 further comprising:
   each of said second members of said first planetary gearset is a member of said first group that is not said first member;
   each of said second members of said second planetary gearset is a member of said second group that is not said first member; and
   each of said second members of said third planetary gearset is a member of said third group that is not said first member.

5. The multi-speed transmission mechanism defined in claim 4 further comprising:
   each of said third members of said first planetary gearset is a member of the first group that is not said first or second member;
   each of said third members of said second planetary gearset is a member of said second group that is not said first or second member; and
   each of said third members of said third planetary gearset is a member of said third group that is not said first or second member.

6. A multi-speed transmissions mechanism, each family member comprising:
   an input shaft;
   an output shaft;
   a transmission housing;
   a planetary gear arrangement including a first planetary gearset having a first member, a second member, and a third member; a second planetary gearset having a first member, a second member, and a third member; a third planetary gearset having a first member, a second member, and a third member; a first interconnecting member continuously interconnecting said first member of said first planetary gearset and said first member of said second planetary gearset; a second interconnecting member continuously interconnecting said second member of said first planetary gearset and said second member of said second planetary gearset; a third interconnecting member continuously interconnecting said third member of said second planetary gearset and said first member of said third planetary gearset; said second member of said third planetary gearset being continuously interconnected with said transmission housing; said output shaft being continuously interconnected with at least one member of said planetary gearsets; and five selectively operable torque transmitting mechanisms consisting of at least first, second, and third rotating type torque transmitting mechanisms that are individually engageable to selectively interconnect said input shaft with at least one of said members of said planetary gearsets, fourth stationary type torque transmitting mechanism, and fifth torque transmitting mechanism selectively rotatably interconnecting two members of one of the planetary gearsets, said five torque transmitting mechanisms being operated in combinations of two to establish at least six forward speed ratios and one reverse speed ratio in said planetary gear arrangement between said input shaft and said output shaft.

7. The multi-speed transmission mechanism defined in claim 6 further comprising:

said first of said rotating torque transmitting mechanisms being operable to selectively interconnect said input shaft and a member of a group consisting of said first interconnecting member and said third member of said first planetary gearset;

said second of said rotating torque transmitting mechanisms being operable to selectively interconnect said input shaft with a member of a group consisting of said second interconnecting member and said third member of said first planetary gearset; and said third of said rotating torque transmitting mechanisms being operable to selectively interconnect said input shaft with said third member of said third planetary gearset.

8. The multi-speed transmission mechanism defined in claim 6 further comprising:

said fourth stationary torque transmitting mechanism being operable to selectively interconnect said transmission housing and a member of a group consisting of said second interconnecting member, said third member of said first planetary gearset, and said third member of said third planetary gearset; and said fifth torque transmitting mechanism being operable to selectively interconnect said third member of said third planetary gearset with said third interconnecting member.

9. A multi-speed transmission mechanism, each family member comprising:

an input shaft;

an output shaft;

a transmission housing;

a planetary gear arrangement including a first planetary gearset having a first member, a second member, and a third member; a second planetary gearser having a first member, a second member, and a third member; a third planetary gearset having a first member, a second member, and a third member; a first interconnecting member continuously interconnecting said first member of said first planetary gearset and said first member of said second planetary gearset; a second interconnecting member continuously interconnecting said second member of said first planetary gearset and said second member of said second planetary gearset; a third interconnecting member continuously interconnecting said third member of said second planetary gearset and said first member of said third planetary gearset; said second member of said third planetary gearset being continuously interconnected with said transmission housing; said output shaft being continuously interconnected with at least one member of said planetary gearsets; said input shaft being connectible with members of said planetary gearsets through torque transmitting mechanisms;

five selectively operable torque transmitting mechanisms selectively connecting members of said planetary gearsets with said input shaft, said transmission housing, or other members of said planetary gearsets wherein:

a first of said torque-transmitting mechanism selectively interconnecting said input shaft with said first interconnecting member, a second of said torque transmitting mechanisms selectively interconnecting said input shaft with said second interconnecting member, a third of said torque transmitting mechanisms selectively interconnecting said input shaft with said third member of said third planetary gearset, a fourth of said torque transmitting mechanisms selectively interconnecting said housing with said second interconnecting member, and a fifth of said torque transmitting mechanisms selectively interconnecting said housing with said third member of said third planetary gearset, or said first torque transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said housing with said third member of said first planetary gearset, said fifth torque-transmitting mechanism selectively interconnecting said housing with said third interconnecting member, or said first torque-transmitting mechanism selectively interconnecting said input shaft with said first interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said housing with said third member of said first planetary gearset, and said fifth torque-transmitting mechanism selectively interconnecting said housing with said third member of said third planetary gearset, or said first torque-transmitting mechanism second said input shaft with said first interconnecting member, said second torque-transmitting mechanism selectively interconnecting said input shaft with said second interconnecting member, said third torque-transmitting mechanism selectively interconnecting said input shaft with said third member of said third planetary gearset, said fourth torque-transmitting mechanism selectively interconnecting said third member of said third planetary gearset with said third interconnecting member, said fifth torque-transmitting mechanism selectively interconnecting said housing with said second interconnecting member, or said first torque-transmitting mechanism selectively interconnecting said third member of said first planetary gearset with said input shaft, said second torque-transmitting mechanism selectively interconnecting said input shaft with said second interconnecting member, said third torque-transmitting mechanism selectively interconnecting said input shaft with said third member of said third planetary gearset, said fourth torque-transmitting mechanism selectively interconnecting said third member of said third planetary gearset with said third interconnecting member, and said fifth torque-transmitting mechanism selectively interconnectng said housing with said third member of said first planetary gearset, or said first torque-transmitting mechanism selectively interconnecting said input shaft with said first interconnecting member, said second torque-transmiitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said housing with said third member of said first planetar gearset, and said fifth torque-transmitting mechanism selectively interconnecting said housing with said third member of said third planetary gearset, or said first torque-transmitting mechanism selectively interconnecting said input shaft with said second interconnecting member, said second torque-transmitting mechanism selectively interconnecting said input shaft with said third member of said first planetary gearset said third torque-transmitting mechanism selectively interconnecting said input shaft with said third member of said third planetary gearset, said fourth torque-transmitting mechanism selectively interconnecting said third member of said third planetary gearset with said third interconnecting member, and said fifth torque-transmitting mechanism selectively interconnecting said housing with said third member of said first planetary gearset; and said five selectively operable torque transmitting mechanisms being operated in combinations of two to establish at least six forward speed ratios and a reverse speed ratio between said input shaft and said output shaft.

* * * * *